United States Patent
Schlesser et al.

(10) Patent No.: US 6,925,793 B2
(45) Date of Patent: Aug. 9, 2005

(54) METHOD AND APPARATUS FOR RE-HYDRATING DRY CROP WITH STEAM

(75) Inventors: Walter Mark Schlesser, Ottumwa, IA (US); Timothy James Kraus, Hedrick, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/816,108

(22) Filed: Apr. 1, 2004

(65) Prior Publication Data

US 2004/0226276 A1 Nov. 18, 2004

Related U.S. Application Data

(63) Continuation-in-part of application No. 10/412,136, filed on Apr. 10, 2003, now abandoned.

(51) Int. Cl.$^7$ .................................................. A01F 39/00
(52) U.S. Cl. .................................... 56/341; 56/DIG. 23
(58) Field of Search ........................ 56/16.4 R, 1, 341, 56/DIG. 23

(56) References Cited

U.S. PATENT DOCUMENTS

| | | | | |
|---|---|---|---|---|
| 1,946,814 A | * | 2/1934 | Sims | 426/455 |
| 2,639,553 A | * | 5/1953 | Russell | 47/58.1 R |
| 3,636,939 A | * | 1/1972 | Sijbring | 126/271.2 R |
| 4,627,338 A | * | 12/1986 | Sprott et al. | 99/534 |
| 5,060,459 A | * | 10/1991 | Herron | 56/10.2 B |
| 5,758,479 A | * | 6/1998 | Staheli | 56/16.4 R |
| 6,109,008 A | * | 8/2000 | Staheli | 56/10.2 B |

* cited by examiner

*Primary Examiner*—Meredith Petravick

(57) ABSTRACT

A baler for forming large parallelepiped bales is equipped with a crop re-hydrating system for re-hydrating dry crop having a moisture content no greater than 14% with steam during the baling process. In one embodiment, the re-hydrating system includes a steam generator which mixes the steam with hot gas during the steam generation process, with the hot gas/steam mixture being distributed to treat the crop. In another embodiment, hot gas, in the form of hot air, is produced separate from the steam and is joined with it to form a mixture for distribution to treat the crop. In both embodiments, the hot gases serve to insulate and to transfer energy to the gaseous steam (saturated vapor), and are at no more than a minimum temperature required for preventing the steam from condensing prior to being applied to the crop. In a further embodiment, a nozzle is located adjacent crop to be re-hydrated, the nozzle being constructed for discharging a central stream of steam or a mixture of steam and gas that is enveloped and insulated from the atmosphere by hot gas so that the steam is prevented from condensing prior to coming into contact with the crop.

13 Claims, 3 Drawing Sheets

METHOD AND APPARATUS FOR RE-HYDRATING DRY CROP WITH STEAM

RELATED APPLICATIONS

This application is a continuation-in-part of application Ser. No. 10/412,136, filed 10 Apr., 2003, now abandoned.

FIELD OF THE INVENTION

The present invention relates to re-hydrating dry crop with steam during the baling process. In the context of the invention, dry crop is crop not intended to be stored as silage and which cannot otherwise be stored without having a preservative added to it to prevent spoilage.

BACKGROUND OF THE INVENTION

A long-standing problem associated with baling leafy crops, such as alfalfa hay, in dry climates is that of having sufficient moisture in the crop so as to prevent the leaves from shattering or becoming detached from the crop stems during transfer of the crop from the crop windrow to the baler and then as the crop moves through the baler. Such a crop has a moisture content of between 70–80%, determined on a wet basis, when first cut and windrowed. Traditionally the windrowed crop has been permitted to dry down to a few percentage points above a desired storage moisture content and then to let the bale dry to this desired moisture content. Leaf shatter becomes a serious problem when the moisture content of the leafy crop drops below about 14% prior to baling.

One somewhat successful procedure to re-hydrate crop during the baling process has been to inject steam into the crop during the baling process. U.S. Pat. Nos. 6,109,008 and 5,758,479 disclose equipment for accomplishing this task.

The use of boilers is one of the most common ways of generating steam. A boiler produces steam which is a saturated vapor, which is invisible to the naked eye. Saturated vapor is 100% gaseous water. The problem with using saturated vapor is that, as the saturated vapor is moved from its production source to the points of interaction with the hay, heat or energy is lost from the saturated vapor and condensation occurs resulting in water droplets being formed. When viewing a steam cloud, the water droplets are the visible component.

In prior art systems such as that disclosed in U.S. Pat. No. 5,758,479, for example, heat is first lost into the ambient environment through steam piping extending between a steam generator, located on a towed trailer, and a steam distribution manifold, carried by the baler pick-up. In addition, as the steam travels through the atmosphere from the injection nozzles towards the crop, energy is lost to the atmosphere. In both cases, water droplets are formed as the water changes from the gaseous state to a liquid state and is deposited on the crop. The problem with this is that water droplets are not as rapidly absorbed into the plant material and therefore do not prevent leaf shatter or loss. Furthermore, introduction of water droplets into the crop may cause spoilage, mold growth, and spontaneous combustion.

SUMMARY OF THE INVENTION

According to the present invention, there is provided a steam generator and steam delivery system in conjunction with a baler which results in re-hydrated crop without the above-noted drawback associated with the prior art crop re-hydrating system.

A broad object of the invention is to provide a steam generator and steam delivery system in conjunction with a crop baler for re-hydrating the crop and being designed so as to reduce the amount of condensed water that is mixed with the water vapor thereby improving the rate of absorption of moisture by the crop.

A more specific object is to provide a steam generator and steam delivery system, as stated in the previous object, wherein a high energy steam, i.e., steam containing very little condensate, is produced by mixing hot gas with a saturated vapor such that the gas acts as a heat reservoir as the steam travels in the steam lines and as a physical barrier or insulator between the steam and the atmosphere as the steam/gas mixture is injected into the crop. One way of achieving this object is to use a direct-fired steam generator which produces steam by metering water into the products of combustion so as to completely evaporate the water. Another way of achieving this object is to use a heat exchanger to transfer heat from a boiler's exhaust gas to an air supply, which in turn is mixed with the water vapor produced by the boiler. Yet another way to reduce condensation is to provide a double-walled steam line and/or discharge nozzle, with the high energy steam or water vapor traveling as a stream through the center of the line and/or nozzle, and with a hot gas or a gas with poor thermal transfer properties encircling the high energy steam or water vapor as it exits the discharge nozzles that are located on the baler and directed toward the crop.

These and other objects of the invention will become apparent from a reading of the ensuing description together with the appended drawings.

BRIEF DESCRIPTION OF THE DRAWINGS

FIG. 4 is a sectional view of a nozzle constructed for dispensing a stream of steam that is enveloped by a stream of hot gas.

DESCRIPTION OF THE PREFERRED EMBODIMENT

Figure 1:
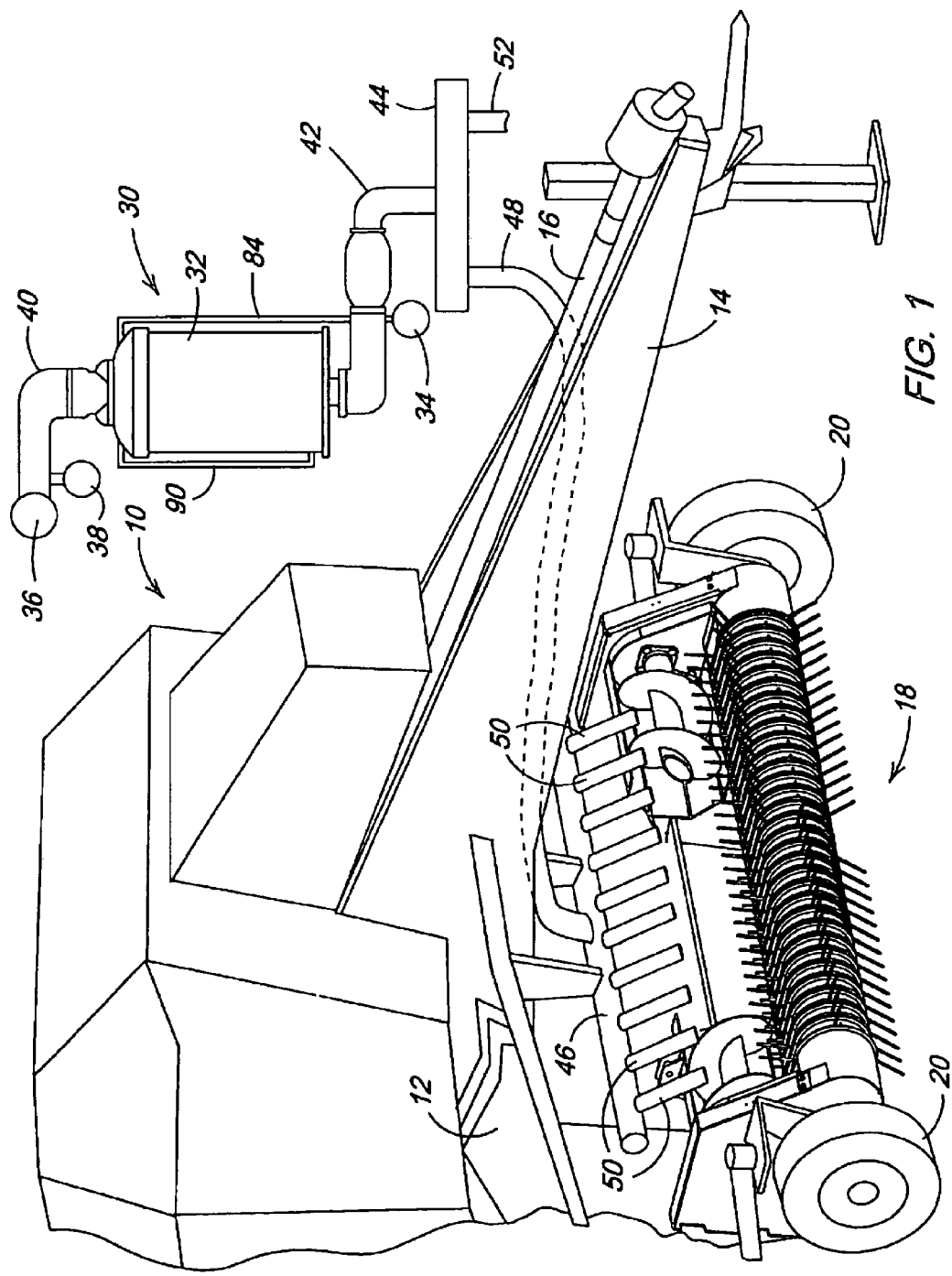
FIG. 1 is a right front perspective view of a large square baler equipped with a steam generator and distribution system, here shown schematically, for re-hydrating crop.

Referring now to FIG. 1, there is shown a large rectangular baler 10 including a main frame 12 supported on a tandem set of ground wheels (not shown) for being towed over the ground by an agricultural tractor (not shown) hitched to the forward end of a tongue 14 fixed to, and projecting forwardly from, the frame 12. A main power shaft 16 is provided for being coupled to the power take-off of the tractor for the purpose of delivering power for driving all of the driven components carried by the baler.

Mounted to the frame 12 for gathering windrowed crop to be baled is a pick-up 18 supported on gauge wheels 20 and including a tined reel that engages a windrow of crop and lifts it for being fed into a chute that directs the crop into a baling chamber for being compressed to form a bale, neither the chute nor the baling chamber being visible in the drawing.

The baler 10 is equipped with a crop re-hydrating system 30, including a steam generator 32 which is coupled to a source of water 34 and to a source of combustion air 36 and a source of combustion fuel 38 by way of a combustion mixture conduit 40. Appropriate controls would be provided for keeping the right fuel/air mixture for combustion and for metering in the right amount of water to be turned into steam. The generator 32, water supply 34, fuel supply 36, and air supply 36 may all be mounted on a mobile trailer, not shown, which in the prior art is mounted between the baler 10 and the towing tractor.

A main hot gas delivery line 42 is coupled between a gas outlet of the steam generator 32 and a manifold 44. Coupled between the manifold 44 and a first gas distribution tube 46 is a first gas feed line 48. The gas distribution tube 46 may be mounted at any convenient location on the baler 10 so as to be adjacent the windrow of crop being lifted into the baler 10 by rotating tines of the pick-up 18. As illustrated, the distribution tube 46 is mounted to the tongue 14 so as to extend across the pick-up 18, with a plurality of gas injector nozzles 50 being spaced across and coupled to the distribution tube 46, and located to inject a mixture of gases, including steam, into the crop as it flows past the nozzles 50. A second gas feed line 52 is shown coupled to the manifold 44 and leads to a second gas distribution tube (not shown) also mounted where its nozzles cooperate with the nozzles 50 to ensure the crop is completely contacted by gas, and hence by the steam portion of the gas.

Figure 2:
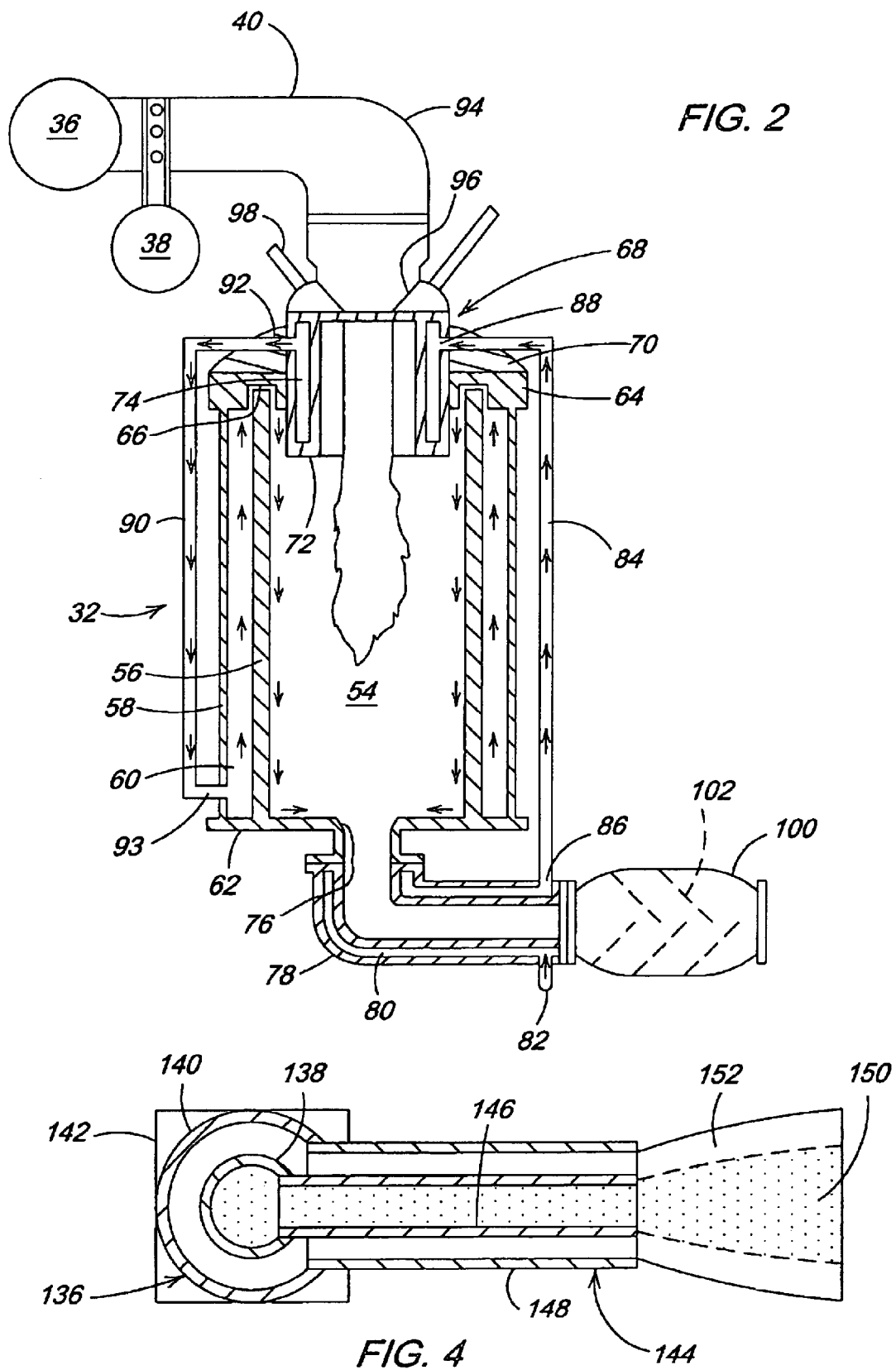
FIG. 2 is a partial sectional view of a direct-fired steam generator together with a mixer for producing a mixture of steam and hot combustion gases.

Referring now to FIG. 2, details of the steam generator 32 are shown. Specifically, it can be seen that the steam generator 32 is a so-called direct-fired steam generator including a central combustion chamber 54 defined by an inner cylindrical wall 56. An outer cylindrical wall 58 is spaced from the inner wall 56 so as to define an annular space 60 which serves to contain water to form a water jacket for cooling the inner wall 56. The bottom ends of the inner and outer cylindrical walls 56 and 58 are closed by a bottom circular plate 62. A top circular plate 64, in the form of a ring, is fixed to the top of the outer wall 58 and contains an annular groove 66 loosely receiving the upper end of the inner wall 56 so that a fluid passage is formed for permitting water to flow over the top of, and down along an inner surface of, the inner wall 56. A burner 68 includes a mounting flange 70 secured to the top circular plate 64 and includes a cylindrical double-walled section 72 that projects downwardly through a center region of the top plate 64 to a location a short distance below the top of the inner wall 56, the interior of the double-walled section 72 forming an annular space 74 for receiving water for forming a water jacket for cooling the burner 68. A steam or vapor outlet 76 is formed centrally in the bottom circular plate 62. An end section of the main steam line 42 is defined by a water-cooled elbow 78 having one end coupled to the outlet 76. The elbow 78 has a double-wall forming a space 80 serving as a water jacket. The source of water 34 is coupled, as at 82, to an inlet leading to the space 80. A conduit 84 is coupled between an outlet 86 leading from the space 80 and an inlet 88 leading to the annular space 74 of the burner 68. A further conduit 90 extends between an outlet 92, leading from the annular space 74 of the burner 68 and an inlet 93 in a lower location of the outer wall 58 leading to the annular space 60 surrounding the combustion chamber 54. The flow of water through the steam generator 32 is indicated by arrows and shows that water supplied at the inlet 82 flows upwardly through the conduit 84, through the water jacket of the burner 68, then down through the conduit 90 to the bottom of the water jacket for the combustion chamber 54. Water flows up the annular space 60 and over the top of, and then downwardly along the inner wall 56, where it is changed into steam by the heat of the flame and hot gases contained in the combustion chamber 54.

The combustion mixture conduit 40 includes an elbow fitting 94 coupled to a conical injector nozzle 96 located at a top central location of the burner 68. An appropriate igniter 98, here shown as a device for creating a pilot flame, is coupled so as to ignite the air/fuel mixture at the end of the nozzle 96 so as to cause a flame for producing the hot gases for changing the liquid water to steam or water vapor.

As the steam exits the bottom of the combustion chamber 54 of the steam generator 32, it will flow through the elbow 78 and into a static mixer 100 forming a section of the main steam line 42 and containing mixing baffles 102.

Thus, it will be appreciated that the products of combustion of the air/fuel mixture will be mixed with, and will impart energy to and/or insulate the steam or water vapor, so that it remains in the vapor state as it is delivered to the crop being elevated by the pick-up 18 during the baling process.

An efficient crop re-hydration process requires that the temperature of the gaseous mixture be kept at the minimum which will result in the steam remaining in a gaseous state, i.e., as water vapor, until it contacts the crop to be re-hydrated. The temperature required to maintain the steam in a gaseous state until it contacts the crop to be re-hydrated would of course vary depending on such things as the ambient temperature and the altitude of the field in which the crop is being grown, for example. A higher temperature would be a detriment since it would merely add additional heat to the crop without increasing the rate of absorption of moisture by the crop and would require the use of more fuel with its additional cost. While the use of such a steam delivery process using pressurized air was not intuitive, since tinder dry hay is very susceptible to leaf shatter when subjected to moderate air velocity, it was found that steam so delivered re-hydrated the leaves before any shattering took place.

Figure 3:
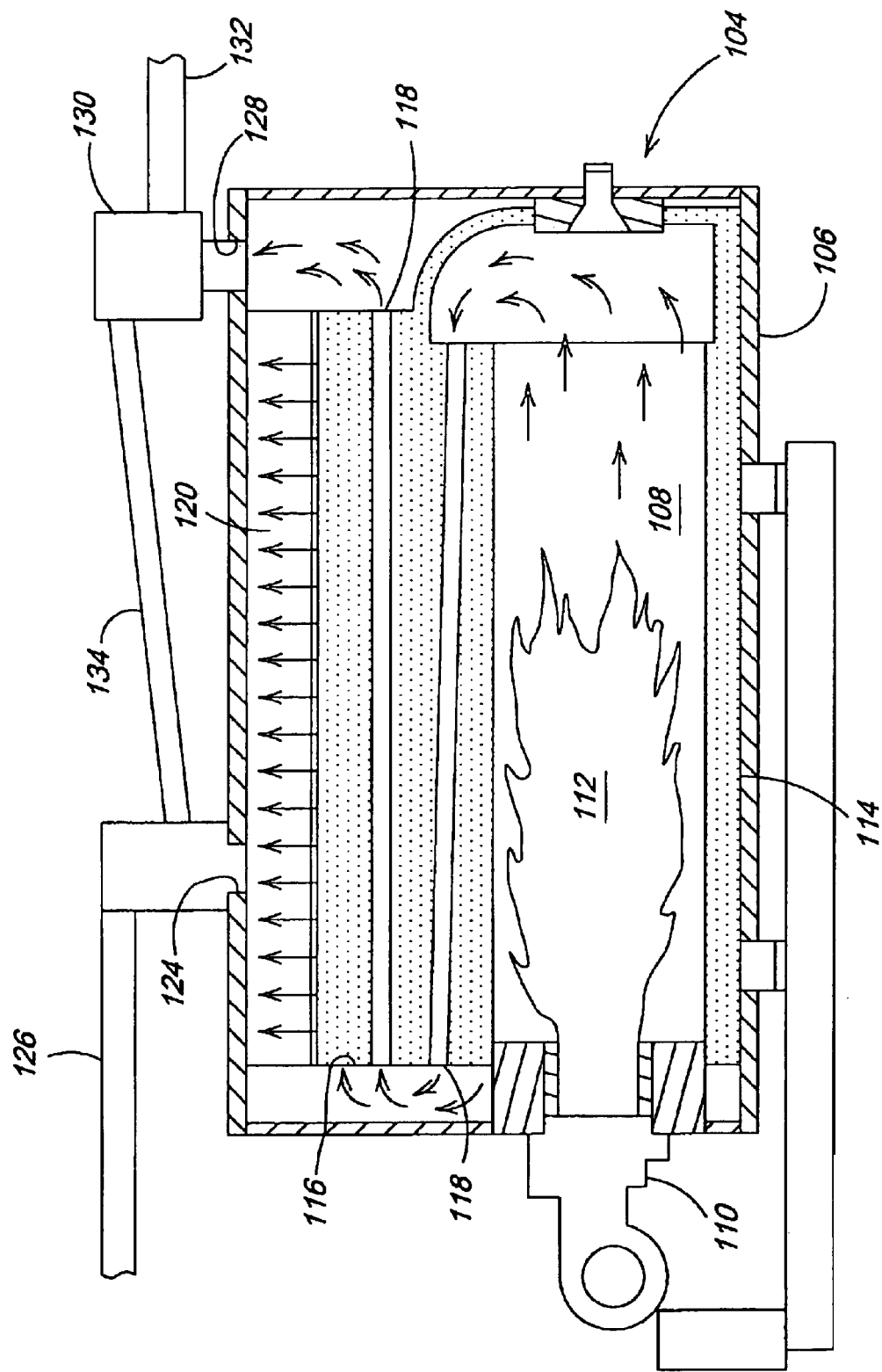
FIG. 3 is a partial sectional view of a steam generator of the boiler type equipped for heating air that is mixed with steam at the steam outlet of the generator.

Referring now to FIG. 3, there is shown a steam generator 104, which may be used in lieu of the steam generator 32 for accomplishing the desired production of a mixture of water vapor and hot gas for treating crop during the baling process. Specifically, the steam generator 104 is designed as a boiler including an insulated enclosed body or housing 106 containing a first compartment forming a combustion chamber 108 having a fuel burner 110 coupled at a left-hand end thereof for burning gas, oil or diesel fuel, for example, this burner being capable of producing a large flame 112 which occupies much of the length of the combustion chamber 108. Completely surrounding the combustion chamber 108 is a water reservoir 114, coupled to a source of water in a manner not shown, including a major section 116 located above the combustion chamber 108. A plurality of heat transfer tubes 118 are provided in the major section 116 of the water reservoir 114 and are connected to receive hot gas from the combustion chamber 108 and route it through the water chamber section 116 so as to heat the water and cause the production of steam at a head space 120 of the chamber section 116. The generated steam passes through an outlet 124 and into a main steam line 126 which is coupled to the manifold 44. A vent 128 is provided for receiving hot gas from the tubes 118 after it has heated the water, and coupled to the vent 128 is a heat exchanger 130. A source of air under pressure is routed into the heat exchanger 130 by way of an inlet conduit 132. A conduit 134 is coupled between an outlet of the heat exchanger 130 and the main gas mixture distribution line 126 so that the heated air is mixed with the saturated steam, with the mixture then being routed to treat crop during the baling process.

Referring now to FIG. 4, there is shown another way of preventing condensation of the steam as it exits the distribution nozzles. Specifically, in this embodiment, a steam distribution tube 136 is provided which is constructed of inner and outer concentric tubes 138 and 140, respectively having their opposite ends closed by plates 142. Mounted at spaced locations along the steam distribution tube 136 are a plurality of nozzles 144 also constructed of inner and outer concentric tubes 146 and 148, respectively. The inner tube 146 of the nozzle 144 has an end coupled to the inner distribution tube 138, and the outer tube 148 of the nozzle 144 is coupled to the outer distribution tube 140. Not shown is a coupling of a main steam distribution line, with the inner tube 138 and a coupling of the outer tube 140 with a source of hot gas, such as the conduit 134, illustrated in FIG. 3, carrying heated air that exits the heat exchanger 130. However, it is to be understood that any source of steam and heated gas may be respectively coupled to the inner and outer tubes 138 and 140, respectively. In any event, gaseous steam or water vapor 150 exiting from the inner tube 146 of the nozzle 144 is surrounded by hot gas 152 exiting from the outer tube 148 of the nozzle 144 so as to insulate the water vapor 150 from the atmosphere while imparting energy to it through a sufficient distance from the nozzle for the water vapor 150 to impinge upon, and be absorbed by, the crop entering the baler 10.

It is to be understood that while distribution tube 136 and nozzles 144 are described in the context of handling just steam in the inner distribution tube 138 and inner nozzle tube 146, that it is within the purview of the invention to distribute a mixture of steam and hot gas through the tubes 138 and 146 and to augment the insulating and energy supplying characteristics of the mixture with an envelope of hot gas supplied through the outer distribution tube 138 and nozzle tubes 148.

Further, it is to be understood that while the re-hydration system 30 is here described as being associated with a large square baler, it could be associated with any other type of baler, or for that matter, with any other type of agricultural crop harvesting equipment where re-hydration of the crop with gaseous steam or water vapor would be beneficial.

Having described the preferred embodiment, it will become apparent that various modifications can be made without departing from the scope of the invention as defined in the accompanying claims.

What is claimed is:

1. A method of re-hydrating crop for baling, comprising:

(a) providing a dry crop;

(b) continuously generating a quantity of steam;

(c) continuously generating a quantity of hot gas;

(d) joining said steam and hot gas together to form a stream of steam and hot gas;

(e) conveying the stream of steam and hot gases to a location adjacent the crop to be re-hydrated; and (f) distributing the stream of steam and hot gases onto the crop, while maintaining the temperature of the stream of steam and hot gases substantially at a minimum temperature required for the steam to remain in a gaseous state until it contacts the crop.

2. The method, as set forth in claim 1, wherein said step of joining includes mixing said steam and hot gases together into a substantially homogenous mixture.

3. The method, as set forth in claim 1, wherein said step of joining includes enveloping said stream of steam with said stream of hot gases so as to create an insulating barrier about said stream of steam.

4. A system for re-hydrating dry crop to be baled, comprising:

(a) a steam generator having a steam outlet;

(b) a steam distribution system coupled between said steam outlet and a location adjacent the dry crop to be re-hydrated; and (c) a source of heated gas coupled to said steam distribution system adjacent said steam outlet, with said heated gas being no greater than a minimum temperature required for maintaining said steam in its gaseous state when it comes into contact with said dry crop to be re-hydrated.

5. The system for re-hydrating crop, as defined in claim 4, wherein said source of heated gas is heated air.

6. The system for re-hydrating crop, as defined in claim 5, wherein said steam generator includes a combustion chamber; a burner coupled to the combustion chamber for causing a flame for creating hot gas; a heat exchanger coupled to said combustion chamber for receiving hot gas; a source of air being coupled to said heat exchanger so as to create said heated air.

7. The system for re-hydrating crop, as set forth in claim 4, wherein said heated gas is exhaust gas from said steam generator.

8. The system for re-hydrating crop, as set forth in claim 7, wherein said distribution system includes a mixer located adjacent said outlet for mixing said steam and heated gas.

9. The system for re-hydrating crop, as set forth in claim 7 wherein said steam generator is a direct-fired steam generator including:

(a) a combustion chamber having opposite first and second ends;

(b) a burner extending into said first end of said combustion chamber;

(c) an air/fuel conveying tube coupled to said burner, whereby a flame will result when an air/fuel mixture in said conveying tube is ignited to thereby result in the creation of said hot gas;

(d) said combustion chamber having a wall exposed to said hot gas;

(e) a water supply conduit coupled for conveying water to flow over said wall of said combustion chamber, whereby water conveyed to said wall is changed into steam which becomes combined with said hot gas at said second end of said combustion chamber; and (f) said distribution system being coupled between said second end of said combustion chamber and a location adjacent said crop for conveying a said steam combined with said hot gas to said crop.

10. The system for re-hydrating crop, as set forth in claim 9, wherein said distribution system includes a mixer coupled adjacent said second end of said combustion chamber for mixing said steam and said hot gas.

11. A system for re-hydrating dry crop to be baled, comprising:

(a) a steam generator including a furnace including a combustion chamber having first and second ends;

(b) a burner being coupled to said first end of said combustion chamber;

(c) a fuel supply conduit being connected to said burner, whereby when fuel is present and ignited a flame will result in said combustion chamber thereby creating hot gas;

(d) a boiler including a water reservoir located adjacent said combustion chamber and having a tube arrangement located in said reservoir and coupled to said second end of said combustion chamber for conveying hot gas from said combustion chamber through said water reservoir so as to cause the formation of steam;

(e) said water reservoir having a steam outlet;

(f) a heat exchanger coupled to said tube arrangement for receiving said hot gas;

(g) a source of air coupled to said heat exchanger and to said steam outlet for supplying heated air for being mixed with said steam; and (h) a steam distribution system coupled between said outlet and a location adjacent said crop to be re-hydrated with said heated air being at no more than a minimum temperature required for maintaining said steam in a gaseous state at least until it reaches said location adjacent said crop to be re-hydrated.

12. A system for re-hydrating a dry crop to be baled comprising:

(a) a steam generator for generating steam;

(b) a source of hot gas;

(c) a steam and hot gas distribution system being coupled between a location adjacent said crop to be re-hydrated and said steam generator and source of hot gas;

(d) said steam and hot gas distribution system being so constructed and arranged that said hot gas is disposed in an insulating and energy transfer relationship to said steam; and (e) said source of hot gas being at a temperature no greater than a minimum temperature required for maintaining said steam in a gaseous state at a time when the steam comes into contact with said crop.

13. The re-hydrating system, as defined in claim 12, wherein said steam and hot gas distribution system includes a plurality of nozzles having discharge ends positioned at said location adjacent said crop to be re-hydrated and each nozzle including:

(a) concentric inner and outer tubes respectively coupled to said steam generator for receiving said steam from said steam generator, and to said source of hot gas for receiving hot gas, whereby said hot gas will envelope and insulate said steam as the steam and hot gas exit said discharge end of a respective nozzle.

* * * * *